United States Patent Office 3,384,555
Patented May 21, 1968

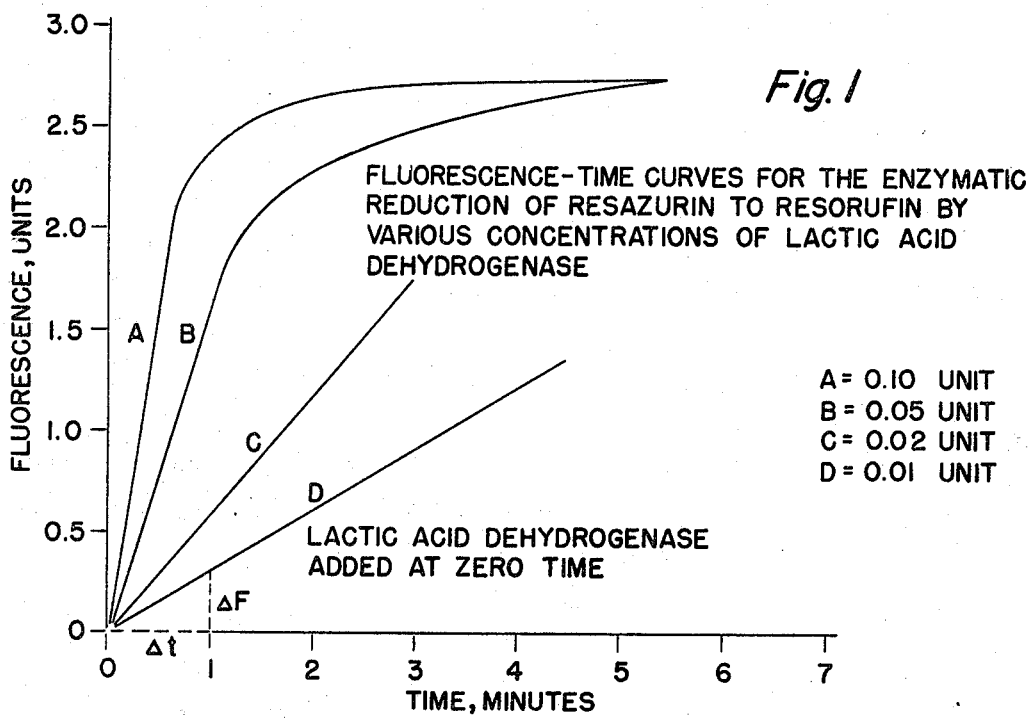
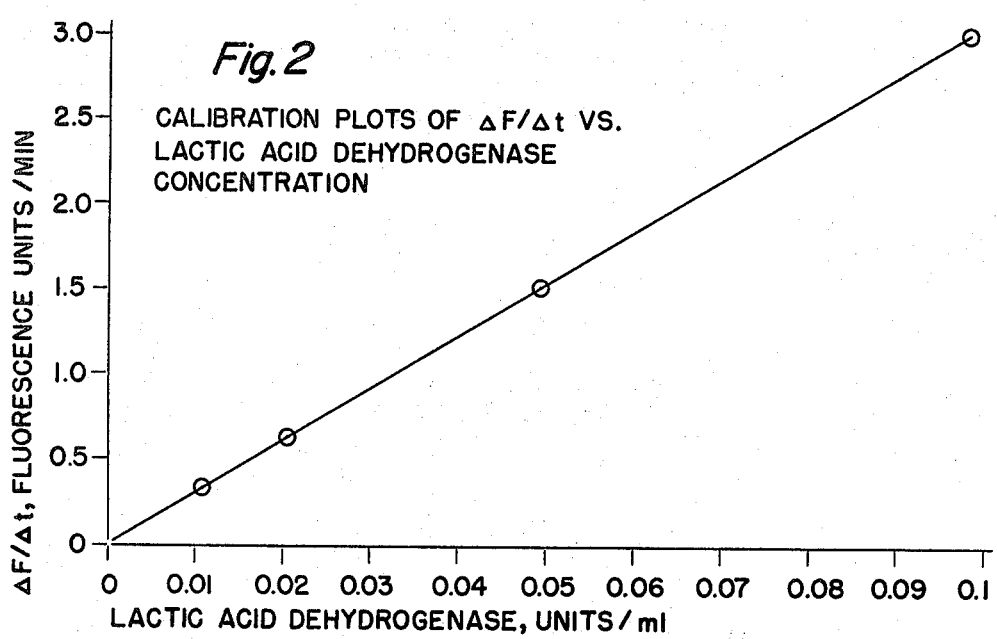

3,384,555
DIRECT FLUOROMETRIC METHOD FOR MEASURING DEHYDROGENASE ACTIVITY
George G. Guilbault, Edgewood, and David N. Kramer, Stevenson, Md., assignors to the United States of America as represented by the Secretary of the Army
Filed Nov. 30, 1965, Ser. No. 510,719
3 Claims. (Cl. 195—103.5)

This invention relates to a new, direct, one step fluorometric method for the assay of dehydrogenase enzymes, and diaphorase by using resazurin in conjunction with the NAD-NADH system. NAD is the conventional abbreviation for nicotinamideadenine dinucleotide and NADH (or NADH$_2$) is the reduced form. See page 791 of the book "Enzymes" by Dixon and Webb, sec. ed., 1964, Academic Press, New York, N.Y.

Spectrophotometry is generally preferred in enzyme assay over manometric and pH procedures, because of its simplicity, its rapidity, and the capability of measuring lower enzyme and substrate concentrations. On the other hand, many of the compounds utilized in spectrophotometric assays have been observed to fluoresce and since fluorescence procedures are several orders of magnitude more sensitive than colorimetric methods, assays based on fluorometry have replaced the colorimetric methods in numerous cases.

Enzymes are biochemical catalysts that enable the many complex chemical reactions, upon which depends the existence of life as we know it, to take place at ordinary temperatures. An important class of enzymes are the dehydrogenases, which in the presence of a hydrogen acceptor such as pyridine nucleotide, effect the dehydrogenation of acids.

Previous assay methods for dehydrogenases and for the natural substrate of these enzymes are those based on colorimetric methods, either by following the NADH oxidation or the reduction of NAD, or using the reducible dyes 2,6 dichloroindophenol or methylene blue.

Prior colorimetric methods for these enzymes have been relatively insensitive (only 0.01 unit of enzyme are determinable). Whereas, fluorescence procedures are much more sensitive (at least two orders of magnitude, so that 0.0001 unit can be detected).

The prior art teaches an assay procedure for dehydrogenases based on the fluorescence of oxidized NAD (nicotinamide adenine dinucleotide) in basic solution. The assay of NAD required heating the reaction products with 6 N sodium hydroxide for 5 to 30 minutes, after which time the fluorescence of oxidized NAD was read at an excitation wavelength of 360 m$\mu$ and an emission wavelength of 460 m$\mu$. In a similar manner, the activity of malic acid dehydrogenase was assayed. Even though this process is sensitive, it is not a one step direct procedure and is also, a long and involved procedure.

The object of our invention is to develop a fluorescence assay procedure, in which a direct measurement of the rate of fluorescence production in an enzyme reaction would be related to the activity of dehydrogenases.

Another object of our invention is to develop a simple, rapid, and direct fluorometric method for measuring the activity of dehydrogenases.

A further object of our invention is to develop a fluorometric method to detect the quantity of lactic acid dehydrogenase, LAD, present in the blood stream.

By the method of our invention it has been found to be more sensitive than previous colorimetric methods (at least two orders of magnitude) and is a direct, one step method in comparison to the indirect method of the prior art thus saving time in conducting this procedure.

Our method has the advantage of being applicable to the direct assay in diagnostic tests in hospitals, clinics, etc., for assaying dehydrogenases in blood.

The non-fluorescent material, resazurin (I) is converted to the highly fluorescent compound, resorufin (II) as follows:

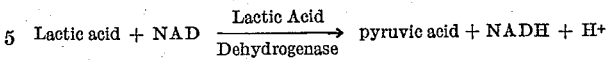

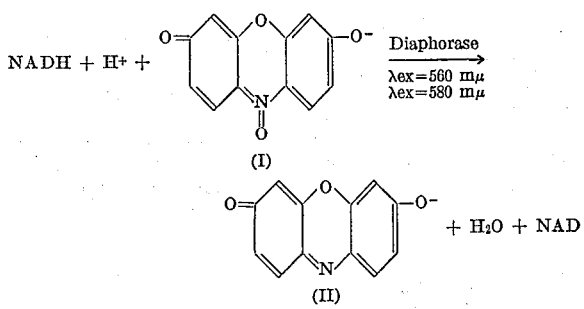

Other and further objects and advantages will be understood by those skilled in the art or will be apparent or pointed out in this disclosure.

The method of measuring enzyme activity at very low substrate concentrations is illustrated in the accompanying drawings, in which FIGURE 1, is a graph illustrating fluorescent time curves for the enzymatic reduction of resazurin to resorufin by various concentrations of lactic acid dehydrogenase (LAD).

FIGURE 2 is a graph illustrating calibration plots of $\Delta F/\Delta t$ versus lactic acid dehydrogenase concentration.

It is to be understood that FIGURES 1 and 2 are illustrative of all the dehydrogenases mentioned herein.

The following reagents are employed in the reaction:

A. ENZYMES (1) Lactic acid dehydrogenase, (LAD), 142 units/mg. One unit of activity is that which causes an initial rate of oxidation of 1 $\mu$mole of NADH per minute under specified conditions at 25° C.

(2) Glutamic acid dehydrogenase (GADH), activity 3.3 enzyme units per mg. of protein one unit of activity is that which causes an initial rate of reduction of one $\mu$mole of NAD per minute under specified conditions at 25° C.

(3) Alcohol dehydrogenase, (ADH), activity 301 units per mg. One unit equals 1 $\mu$mole of NAD reduced per minute at 25° C.

(4) Malic acid dehydrogenase, NADH, 670 enzyme units per mg. of protein one unit of activity is that which causes an initial rate of reduction of one $\mu$mole of NAD per minute under specified conditions at 25° C.

(5) L-$\alpha$-glycerophosphate dehydrogenase (GPDH), activity 55 units per mg.

(6) Glucose-6-phosphate dehydrogenase (G6PDH), obtained from yeast, activity 170 enzyme units per mg.

(7) Glycerol dehydrogenase (GDH), activity 5.0 units per mg.

(8) Diaphorase, lipoamide dehydrogenase, activity 16 units per mg.

B. SUBSTRATES (1) Resazurin. A stock 2×10$^{-4}$ M solution was prepared in methyl Cellosolve. This solution should be non-fluorescent, with a bluish-red hue. A sample of resazurin that is contaminated with resorufin may be purified by acetylation of the compound with acetic anhydride and pyridine by conventional procedures, followed by an isolation of the ester in water and recrystallization. Addition of base to the ester will then give pure resazurin.

(2) Sodium maleate, 0.1 M was prepared by dissolving the neutralized acid in tris buffer, pH 9.0.

(3) Sodium lactate, 0.01 M was prepared by dissolving the neutralized acid in tris buffer, pH 9.0.

(4) Ethanol solution, 0.05 M, was prepared in tris buffer, pH 9.0.

(5) Sodium glutamate, 0.01 M. A stock is prepared by dissolving the purified compound in tris buffer, pH 8.0.

(6) Glucose-6-phosphate. A $10^{-3}$ M solution is prepared in tris buffer, pH 8.5, with the purified material.

(7) Glycerol phosphate, $10^{-3}$ M. solution is prepared in tris buffer, pH 9.0.

(8) L(—)-α-glycerol phosphate, $10^{-3}$ M solution is prepared in tris buffer, pH 9.0.

(9) Nicotinamide adenine dinucleotide (NAD), and its reduced form, NADH.

(10) Nicotinamide adenine dinucleotide phosphate (NADP), and its reduced form, NADPH. Stock $10^{-3}$ M solutions are prepared by dissolving the compound in triply distilled water.

C. BUFFER (1) Tris buffer:

(a) Tris (hydroxymethyl) aminomethane, pH 8.0 to 9.0, 0.01 and 0.1 M is prepared by dissolving the appropriate amount of buffer in distilled water. HCl, 0.1 M, is added to adjust the pH.

All fluorescent measurements are made with an Aminco-Bowman Spectrophotofluorometer (SPF), equipped with a thermoelectric cooler to maintain a constant temperature at 25° C.

According to our invention, the assay of enzymes is directed along two paths: (1) to replace the long and tedious procedures required in most previous assays with simple, direct measurements, and (2) to use more sensitive procedures in all analysis. This has been our goal in the development of the present procedure for dehydrogenases. The prior art lengthy methods, are replaced with the direct measurement of the initial rate of production of resorufin, $\Delta F/\Delta t$, which is a direct measure of the concentration of the enzymes present. Since resorufin is a highly fluorescent compound (fluorescence coefficient-$1.56\times10^7$, compared to $1.40\times10^6$ for quinine sulfate in 0.1 $NH_2SO_4$), the method is extremely sensitive, and small concentrations of enzymes may be determined ($10^{-4}$ units).

Since the rate of production of resorufin is proportional to the concentration of diaphorase, NAD and resazurin, as well as to the dehydrogenases, these materials may be determined by this procedure. A method is not described for NAD, since NADH is a serious interference in attempts to quantatively determine this coenzyme. If NADH is known to be absent, NAD is concentrations of $10^{-6}$ to $10^{-8}$ may be determined by this procedure. Also, this method provides a specific qualitative, as well as quantitative, test for resazurin. By using excess concentrations of diaphorase (0.08 unit), resazurin $$(6.7\times10^{-6} \text{ M})$$

is directly proportional to the concentration of the dehydrogenase to be determined.

Since glucose-6-phosphate dehydrogenase is active with the coenzyme NADP and not NAD, this substance is used in the determination of this dehydrogenase. A concentration of $6.7\times10^{-6}$ (0.1 ml. of $2\times10^{-4}$ M added in the procedure) is optimum, and in the absence of NADPH, $5\times10^{-6}$ to $5\times10^{-8}$ M concentrations of NADP produced a linear change in the rate of reaction, $\Delta F/\text{min.}$, and hence can be determined.

For quantitative determination of diaphorase, the following equation was used:

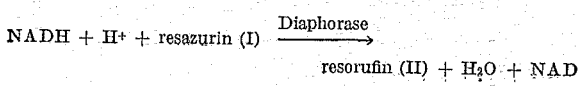

$$NADH + H^+ + \text{resazurin (I)} \xrightarrow{\text{Diaphorase}} \text{resorufin (II)} + H_2O + NAD$$

at a NADH concentration of $6.7\times10^{-6}$ M, the rate of production of resorufin, $\Delta F/\text{min.}$, is proportional to the concentration of diaphorase with good accuracy and reproducibility (see Table I, column 5). At diaphorase concentrations of 0.08 unit and $6.7\times10^{-6}$ M, the rate of reaction is proportional only to the concentration of NADH.

The stock reaszurin solution, $2\times10^{-4}$ M in methylcellosolve, is stable for at least a year, and the NAD and NADH solutions are stable for at least a week when stored at 5° C. The substrate solutions are stable for months at room temperature. The only unstable reagent is diaphorase, whose solutions must be prepared fresh each day. The calibration plots, however, need not be repeated daily provided they are initially determined with fresh enzyme.

When the substrate is present in low concentrations, the rate of reaction is proportional to the concentration of the substrate used (i.e. sodium lactate, etc.). Generally, at concentrations of $10^{-2}$ M the rate becomes independent of the concentration of substrate, and this maximum concentration was used in the analysis (see substrates, columns 2 and 3 for the concentration used). Since the rate of all these reactions is higher at pH's 8 to 9 (the reverse reaction becoming more prevalent at lower pH's), and since the fluorescence of resorufin is also a maximum at pH 8 to 9, this approximate range was used in all analyses. The pH optimum for each reaction is given under the individual substrates.

Our method is a simple, direct fluorometric method for measuring the activity of dehydrogenases. The method is based upon the conversion of the non-fluorescent substrate material, resazurin, to the highly fluorescent compound, resorufin, in conjunction with the NAD–NADH system. By the given examples, approximately 0.00010 to 0.1000 unit/ml. of lactic acid dehydrogenase (LAD), alcohol dehydrogenase (ADH), malic acid dehydrogenase (MADH), glutamic acid dehydrogenase (GADH), glucose-6-phosphate dehydrogenase (G6PDH), L-α-glycerophosphate dehydrogenase (GPDH) and glycerol dehydrogenase (GDH) may be determined with standard deviations of approximately ±1.0%. Likewise, diaphorase, 0.000400 to 0.0800 unit/ml., resazurin, $10^{-8}$ to $10^{-5}$ M, and NADH, $2\times10^{-7}$ to $2\times10^{-5}$ M, may be determined with standard deviations of ±0.5, 0.8, and 0.5% respectively.

The following examples are given to further illustrate this invention:

Example I

The following procedure is conducted for the determination of dehydrogenases. Two ml. of the appropriate substrate (sodium maleate for MADH, sodium glutamate for GADH, glucose-6-phosphate for G6PDH, glycerol phosphate for GDH, L(—)-α-glycerol phosphate for GPDH), of the concentration and PH specified, 0.1 ml. of $2\times10^{-4}$ M NAD (NADP in the determination of G-6-PDH), 0.1 ml. of $2\times10^{-4}$ M resazurin, and 1 ml. of diaphorase (0.08 unit) are placed in the fluorescence cell in the SPF, and the instrument is adjusted to read zero. At zero time, 0.1 ml. of the solution of the dehydrogenase to be analyzed (containing approximately 0.0001 to 0.50 unit per ml.) is then added, and the change in fluorescence with time, $\Delta F/\Delta t$ is automatically recorded at the excitation and emission wavelengths given. From predetermined calibration plots of $\Delta F/\text{minute}$ vs. concentration, the quantity of dehydrogenase present in solution is calculated.

There should be no blank in this procedure (i.e., no increase in fluorescence with time without the dehydrogenase added). If such an increase is observed, the purity of the reagents, especially the NAD and diaphorase, should be checked.

The resorufin produced is measured at excitation and emission wavelengths of 560 and 580 mμ, respectively.

Example II

Determination of LAD is as follows: Two ml. of 0.01 M sodium lactate in tris buffer, pH 9.0, 0.1 ml. of $10^{-3}$ M NAD, 0.1 ml. of $2 \times 10^{-4}$ M resazurin and 1 ml. of diaphorase (0.08 unit per ml.) are placed in a 3.0 ml. fluorescence cell thermostated at 25° C. in the SPF and the instrument is adjusted to read zero fluorescence. At zero time, 0.1 ml. of a solution of the LAD (containing 0.00040 to 0.50 unit per ml.) is added, and the change in the fluorescence with time, $\Delta F/\Delta t$, is automatically recorded at excitation and emission wavelengths of 560 and 580 m$\mu$. From predetermined calibration plots of $\Delta F$ per minute vs. concentration, the quantity of LAD present in an unknown solution may be calculated.

Example III

Determination of ADH is as follows: Two ml. of 0.1 M ethyl alcohol in tris buffer, pH 9.0, 0.1 ml. of $10^{-3}$ M NAD, 0.1 ml. of $2 \times 10^{-4}$ M resazurin, and 1 ml. of diaphorase (0.08 unit per ml.) are placed in a 3.0 ml. fluorescence cell thermostated at 25° C. in the SPF and the instrument is adjusted to read zero fluorescence. At zero time, 0.1 ml. of a solution of ADH (containing 0.00030 to 0.032 unit per ml.) is added. From calibration plots of $\Delta F$ per minute vs. ADH concentration, the amount of alcohol dehydrogenase originally present may be determined. The reactions involved are shown by the following equations:

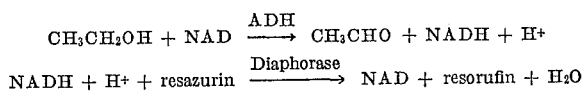

$$CH_3CH_2OH + NAD \xrightarrow{ADH} CH_3CHO + NADH + H^+$$

$$NADH + H^+ + \text{resazurin} \xrightarrow{\text{Diaphorase}} NAD + \text{resorufin} + H_2O$$

Example IV

The determination of diaphorase. To 3 ml. of $2 \times 10^{-4}$ M solution of NADH in tris buffer, pH 8.0, is added 0.1 ml. of $2 \times 10^{-4}$ M, resazurin and the instrument is adjusted to read zero fluorescence at 560 and 580 m$\mu$. At zero time, 0.1 ml. of the unknown diaphorase solution is added (containing 0.001 to 0.10 unit). The amount of diaphorase present is then calculated from predetermined calibration curves of $\Delta F/\Delta t$ vs. diaphorase concentration.

The results of the determination of LAD, ADH, MADH, GADH, G-6-PDH, and GDH are given in Table II, column 6. By the examples described, 0.000300 to 0.100 unit per ml. of LAD, 0.000303 to 0.151 unit per ml. of ADH, 0.00105 to 0.510 unit per ml. of MADH, 0.000103 to 0.0330 unit per ml. of GADH, 0.00202 to 0.340 unit per ml. of G-5-PDH, 0.0105 to 1.10 units per ml. of GPDH and 0.00500 to 0.105 unit per ml. of GDH may be determined with standard deviations of ±1.1, 0.8, 1.4, 0.9, 1.1, 1.1, and 0.9%, respectively. Likewise, diaphorase, 0.000400 to 0.0800 unit per ml., may be determined with a standard deviation of ±0.5, respectively.

Further modifications will also occur to those skilled in this art and these modifications are considered to fall within the spirit and scope of the invention as set forth in the appended claims.

TABLE I—DETERMINATION OF DIAPHORASE

| Diaphorase, units/ml. | | Error, Percent |
|---|---|---|
| Present | Found | |
| 0.000400 | 0.000404 | +1.0 |
| 0.000800 | 0.000802 | +0.2 |
| 0.00400 | 0.00397 | −0.7 |
| 0.00800 | 0.00798 | −0.2 |
| 0.0200 | 0.0202 | +1.0 |
| 0.0400 | 0.0402 | +0.5 |
| 0.0800 | 0.0800 | 0.0 |
| | | [1] ±0.5 |

[1] Standard Dev.

TABLE II.—DETERMINATION OF VARIOUS DEHYDROGENASES

| LDH, units/ml. | | Error, Percent | MADH, units/ml. | | Error, Percent |
|---|---|---|---|---|---|
| Present | Found | | Present | Found | |
| 0.000300 | 0.000303 | +1.0 | 0.00105 | 0.00104 | −1.0 |
| 0.000500 | 0.000490 | −2.0 | 0.00450 | 0.00457 | +1.5 |
| 0.00100 | 0.00100 | 0.0 | 0.0105 | 0.0105 | 0.0 |
| 0.00500 | 0.00503 | +0.6 | 0.0450 | 0.0446 | −0.9 |
| 0.0100 | 0.00990 | −1.0 | 0.108 | 0.107 | −1.0 |
| 0.0500 | 0.0502 | +0.4 | 0.223 | 0.227 | +1.8 |
| 0.100 | 0.101 | +1.0 | 0.510 | 0.509 | −0.2 |
| | | [1] ±1.1 | | | [1] ±1.4 |

| ADH, units/ml. | | Error, Percent | GADH, units/ml. | | Error, Percent |
|---|---|---|---|---|---|
| Present | Found | | Present | Found | |
| 0.000303 | 0.000301 | −0.7 | 0.000103 | 0.000104 | +1.0 |
| 0.000606 | 0.000610 | +0.7 | 0.000330 | 0.000328 | −0.7 |
| 0.00151 | 0.00149 | −1.3 | 0.000670 | 0.000673 | +0.5 |
| 0.00606 | 0.00606 | 0.0 | 0.00165 | 0.00165 | 0.0 |
| 0.0303 | 0.0302 | −0.3 | 0.00330 | 0.00330 | +1.0 |
| 0.0606 | 0.0608 | +0.4 | 0.0165 | 0.0164 | −0.6 |
| 0.151 | 0.153 | +1.3 | 0.0330 | 0.0335 | +1.5 |
| | | [1] ±0.8 | | | [1] ±0.9 |

| G-6-PDH, units/ml. | | Error, Percent | GPDH, units/ml. | | Error, Percent |
|---|---|---|---|---|---|
| Present | Found | | Present | Found | |
| 0.00202 | 0.00205 | +1.5 | 0.0105 | 0.0104 | −1.0 |
| 0.00850 | 0.00850 | 0.0 | 0.0210 | 0.0208 | −1.0 |
| 0.0170 | 0.0169 | −0.6 | 0.0550 | 0.0553 | +0.5 |
| 0.0430 | 0.0434 | +1.0 | 0.110 | 0.112 | +1.9 |
| 0.0850 | 0.0853 | +0.4 | 0.220 | 0.220 | 0.0 |
| 0.170 | 0.173 | +1.7 | 0.550 | 0.551 | +0.2 |
| 0.340 | 0.337 | −1.0 | 1.10 | 1.11 | +0.9 |
| | | [1] ±1.1 | | | [1] ±1.1 |

| GDH, units/ml. | | Error, Percent |
|---|---|---|
| Present | Found | |
| 0.00500 | 0.00501 | +0.2 |
| 0.0110 | 0.0111 | +0.9 |
| 0.0340 | 0.0335 | −1.5 |
| 0.0505 | 0.0504 | −0.2 |
| 0.100 | 0.101 | +1.0 |
| 0.505 | 0.504 | −0.2 |
| | | [1] ±0.9 |

[1] Standard Dev.

We claim:
1. A fluorometric method for the quantitative determination of a dehydrogenase which comprises:
   (a) placing known amounts of resazurin, diaphorase, nicotinamide adenine dinucleotide and a substrate comprising a member of the group consisting of alkali metal salts of malic, lactic, and glutamic acids, ethanol, glucose-6-phosphate, glycerol phosphate, (−)-α-glycerol phosphate in a fluorescence cell of a spectrophotofluorometer at a buffered pH in the range 8.0–9.0;
   (b) adding an unknown concentration of a dehydrogenase corresponding to its substrate at zero time;
   (c) measuring the change in fluorescence with time to determine the concentration of dehydrogenase originally present.

2. A fluorometric method for the determination of a dehydrogenase as set forth in claim 1 in which the concentration of the unknown enzyme is in the range $1 \times 10^{-4}$ to $1 \times 10^{-1}$.

3. A fluorometric method for the quantitative determination of lactic acid dehydrogenase which comprises:
   (a) placing known amounts of resazurin, diaphorase, nicotinamide adenine dinucleotide and an alkali metal salt of lactic acid in a fluorescence cell of a spectrophotofluorometer at a buffered pH in the range 8.0–9.0;
   (b) adding an unknown concentration of lactic acid dehydrogenase at zero time;
   (c) measuring the change in fluorescence with time to determine the concentration of said dehydrogenase orginally present.

References Cited

UNITED STATES PATENTS 2,999,052   9/1961   Albaum et al. ____ 195—103.5

OTHER REFERENCES

Colowick et al.; Methods in Enzymology, vol. IV, p. 185, 1957.

ALVIN E. TANENHOLTZ, *Primary Examiner.*